June 24, 1930.  A. L. DOTTER  1,767,057
PROCESS AND APPARATUS FOR PURIFYING AIR
Filed March 26, 1928
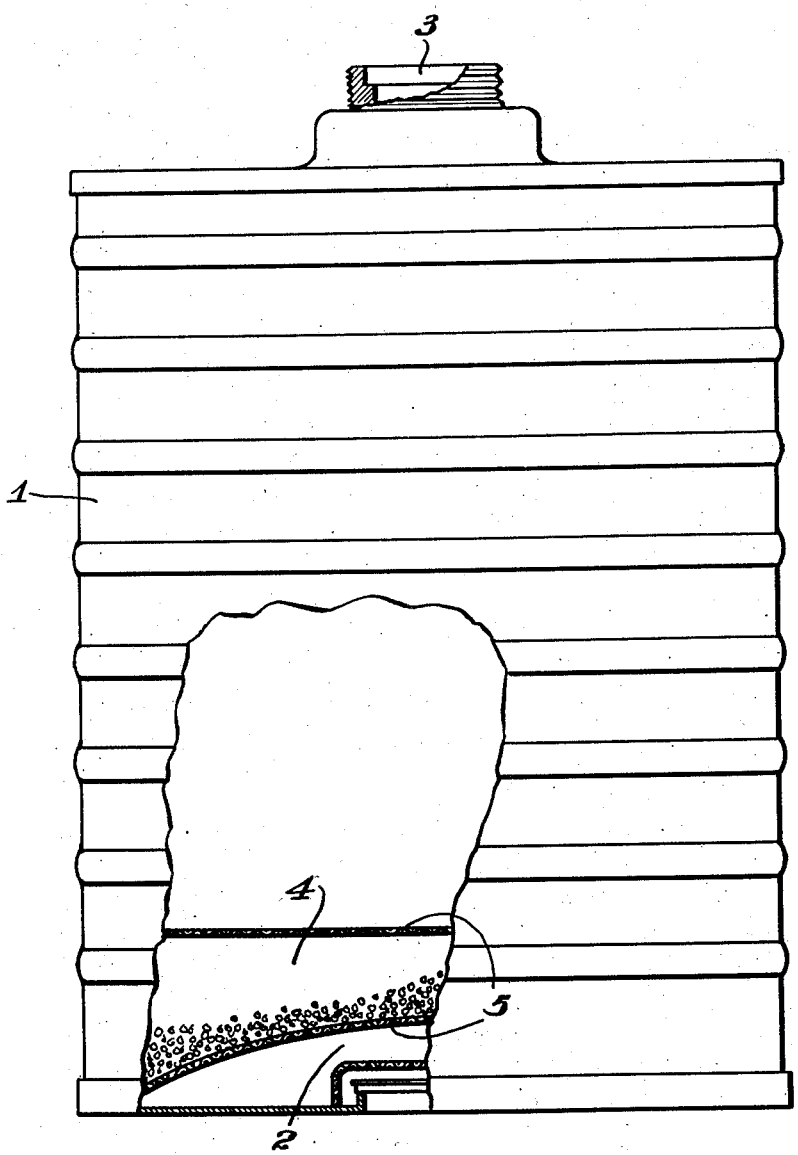
WITNESS
A B Wallace.
INVENTOR
Arthur L. Dotter
by Brown & Critchlow
his attorneys.

Patented June 24, 1930

1,767,057

UNITED STATES PATENT OFFICE

ARTHUR L. DOTTER, OF PITTSBURGH, PENNSYLVANIA, ASSIGNOR TO MINE SAFETY APPLIANCES COMPANY, A CORPORATION OF PENNSYLVANIA

PROCESS AND APPARATUS FOR PURIFYING AIR

Application filed March 26, 1928. Serial No. 264,758.

The invention relates to gas purifying apparatus, and especially to canisters used with gas masks to render air suitable for breathing.

The object of the invention is to provide a gas mask canister or the like with a highly porous gas-purifying material which, although retaining its gas absorbing properties, is particularly effective for removing ammonia; which can be cheaply and easily prepared, can be used in the canisters without damage thereto and without affecting the efficiency of other absorbents contained therein; which does not cause substantial heating of the air; and which possesses relatively long service efficiency.

I have discovered, and it is upon this that my invention is predicated, that by impregnating a highly porous gas-purifying material, activated charcoal for example, with a small amount of a strong inorganic acid, such as hydrochloric or sulfuric acid, they become highly efficient ammonia removers, and the ammonia absorbing power of the compositions is much greater than the sum of the individual ammonia absorbing powers of the gas-purifying material and the amount of acid used. The compositions are preferably used in the dry condition, and in use no substantial amount of heat is developed.

One embodiment of the invention is illustrated in the accompanying drawing, which represents an elevational view, partly in section, of a gas mask canister containing the ammonia remover.

The porous materials used to produce the new ammonia removers comprise those known in the art as gas adsorbents, typical examples of which are activated charcoal and various gels, it being characteristic of these materials that they are inert and highly porous. According to the invention, the materials, as ordinarily prepared for air purifying use, are treated to impregnate them with a small amount of a strong inorganic acid, and as used herein, this expression refers to inorganic acids which in a one normal aqueous solution have an ionization degree of 0.5 or over at 18° C., such as sulfuric, nitric and hydrochloric acids, the latter acid being preferred. The process is preferably so conducted that the treated material is dry, or substantially dry.

In the preferred practice of the invention, activated charcoal is immersed for a considerable time in hydrochloric acid of about 1.2 specific gravity, after which the acid is drained off, and the charcoal is washed to remove a substantial portion of the acid remaining in the charcoal. Satisfactory results have been produced by agitating the charcoal in four separate, successive changes of water, the amount of water used being sufficient to just cover the charcoal. The washed charcoal, with such acid as remains in its pores is then dried, preferably at about 150° C., after which it is ready for use.

In the accompanying drawing a canister 1, of the usual type, provided with an air inlet valve 2 and an air outlet valve 3, there is a layer 4 of the purifier supported between screens 5. When suction is applied to the outlet, as by inhalation air enters through valve 2, and passes through the layer of gas purifier, and during this passage any ammonia in the air is removed substantially completely. The canister may also contain other materials for removal of other gases. The hydrochloric acid left in the washed and dried material is retained so tenaciously, probably by adsorption, that the amount of acid, if any, picked up by air passed through it is so slight as not to be detected when the air is breathed, and thus the effluent air is not contaminated by the acid.

As indicative of the efficiency of the new purifier, a sample of activated charcoal prepared in the foregoing manner was subjected to the standard tube test to determine how long it would function in removing ammonia from air. In this test, air containing 2 per cent of ammonia and having a relative humidity of 50 per cent was passed at the rate of 1571 cc. per minute through a column of the purifier 10 centimeters in length and 2 centimeters in diameter. The effluent gas was continuously tested to determine when the ammonia present in it became more than 0.01 per cent. In this test the time elapsing from the start of the experiment until the ammonia concentration of the effluent reaches 0.01 per cent is known as the service time. The test showed that the purifier had a service time of 50 minutes. A similar test of an equal amount of untreated activated charcoal of the same grade showed that its service time was but 2 minutes. By determining the amount of hydrochloric acid contained in the treated charcoal, it was calculated that its ammonia combining power was equal to a service time of 29 minutes. These tests show that a purifier comprising a highly porous adsorbent material impregnated with a small amount of hydrochloric acid has a much greater service time than the sum of the service time of the two separate components of the purifier.

These tests also show that the amount of acid present in the purifier is too small to itself account for the increased efficiency, for its service time plus that of the untreated absorbent is equal to but about three-fifths of that of the purifier. While it may not be the correct theory, I now believe that the charcoal possesses ability to hold ammonia once it is attracted into the pores, but that it does not itself possess the ability to draw the ammonia into the intimate surface contact necessary for adsorption. The avidity with which ammonia combines with strong acids is well known, and it is also known that activated charcoal strongly adsorbs acids such as hydrochloric. Hence I now believe that the increased efficiency of the purifier according to the invention is due to acid adsorbed in the ports of the charcoal, which acts as a "promoter" to initially attract the ammonia, and that once the ammonia adsorption commences, the charcoal then continues to remove it to the limit of its ability, even though the acid has long since been fully neutralized.

Although activated charcoal is preferably used, other similar materials may be treated to prepare the purifier according to the invention. Such materials are, for example, the adsorbent known in the art and sold as "silica gel," and other gels having analogous characteristics, such as those comprising alumina, iron oxides, and similar metallic oxides, or mixtures with one another, or with other gel-forming materials. It is also possible to use hydrogen chloride as the impregnant, this being an equivalent of its solution for the purposes of the invention, but in general it will be more satisfactory to use hydrochloric acid, as previously described.

While the purifier is especially adapted for the removal of ammonia from air to be breathed, it has been found that the acid treatment does not seriously impair the capability of the charcoal to remove other obnoxious gases and vapors, such as those of carbon tetrachloride, alcohol, acetic acid, petroleum, turpentine, and chlorpicrin. From this it follows that the improved purifier may be used in gas mask canisters not only for the removal of ammonia from air to be breathed, but also for the removal of other gases and vapors. The action of the purifier according to the invention in removing ammonia is probably a combination of chemical action of the acid and physical action exerted by the material, such as adsorption or absorption; but it is not possible exactly to specify the action of the material, and so it is preferred to use the term "absorbing" in the claims, as denoting removal of ammonia from air without limiting its specific action in so doing.

Reference is made to my earlier abandoned application, Serial No. 121,493 filed July 9, 1926 in which the subject matter hereof is disclosed.

According to the provisions of the patent statutes, I have explained the principle and mode of operation of my invention, and have illustrated and described what I now consider to be its best embodiment. However, I desire to have it understood that, within the scope of the appended claims the invention may be practiced otherwise than as specifically illustrated and described.

I claim as my invention:

1. Apparatus for removing ammonia from air to render it suitable for breathing, comprising a container constructed for passage of air therethrough, and having therein a dry, inert, highly porous gas-purifying material, said material having adsorbed in pores thereof a strong inorganic acid a one-normal aqueous solution of which at 18° C. has an ionization degree of about 0.5 or over, whereby said material is activated to substantially increase its capability of absorbing ammonia, the ammonia absorbing power of said acid-containing material being considerably greater than the sum of the individual ammonia absorbing powers of said material and the acid contained therein.

2. Apparatus for removing ammonia from air to render it suitable for breathing, comprising a container constructed for passage of air therethrough, and having therein a dry, inert, highly porous gas-purifying material, said material being activated by hydrochloric acid adsorbed in pores thereof to substantially increase its capability of absorbing ammonia, the ammonia absorbing power of said acid-containing material being considerably greater than the sum of the individual ammonia absorbing powers of said material and the acid contained therein.

3. Apparatus for removing ammonia from air to render it suitable for breathing, comprising a container constructed for passage of air therethrough, and having therein dry activated charcoal which is itself incapable of absorbing substantial amounts of ammonia, said charcoal being further activated by hydrochloric acid adsorbed in pores thereof to substantially increase its capability of absorbing ammonia, the ammonia absorbing power of said acid-containing charcoal being considerably greater than the sum of the individual ammonia absorbing powers of said charcoal and the acid contained therein.

4. A process of purifying air containing ammonia to render it suitable for breathing directly after treatment, comprising passing the air through a body of dry, inert, highly porous gas-purifying material having adsorbed in pores thereof an inorganic acid which in a one-normal aqueous solution has an ionization degree of about 0.5 or over at 18° C., said material acting to remove substantially all of the ammonia from the air without causing material heating of the air.

5. A process of purifying air containing ammonia to render it suitable for breathing directly after treatment, comprising passing the air through a body of dry, inert, highly porous gas-purifying material having adsorbed in pores thereof hydrochloric acid, whereby to remove substantially all of the ammonia from the air without causing undesirable heating thereof.

6. A process of purifying air containing ammonia to render it suitable for breathing directly after treatment, comprising passing the air through a body of activated charcoal having hydrochloric acid adsorbed in pores thereof, said acid-containing charcoal being dry to the touch and acting to remove and retain materially larger amounts of ammonia from air than the sum of the absorptive powers of the acid and the charcoal separately, and without causing material heating of the air.

In testimony whereof, I sign my name.

ARTHUR L. DOTTER.